United States Patent
Chenoweth (12)

(10) Patent No.: US 6,178,777 B1
(45) Date of Patent: Jan. 30, 2001

(54) SIDE-DISCHARGE MELTER FOR USE IN THE MANUFACTURE OF FIBERGLASS, AND CORRESPONDING METHOD

(75) Inventor: Vaughn Charles Chenoweth, Coldwater, MI (US)

(73) Assignee: Guardian Fiberglass, Inc., Albion, MI (US)

(*) Notice: Under 35 U.S.C. 154(b), the term of this patent shall be extended for 0 days.

(21) Appl. No.: 09/408,520

(22) Filed: Sep. 30, 1999

Related U.S. Application Data (62) Division of application No. 08/917,207, filed on Aug. 25, 1997, now Pat. No. 5,961,686.

(51) Int. Cl.⁷ .................................................. C03B 3/00
(52) U.S. Cl. ................. 65/136.2; 65/135.1; 65/135.6; 65/136.4; 65/346; 65/355; 373/28
(58) Field of Search ................. 65/29.13, 29.21, 65/135.1, 135.6, 136.4, 136.2, 441, 482, 502, 540, 346, 355; 373/28

(56) References Cited

U.S. PATENT DOCUMENTS

| | | |
|---|---|---|
| Re. 30,521 | 2/1981 | Faulkner et al. . |
| Re. 30,674 | 7/1981 | Wenda et al. . |
| 2,089,690 | 8/1937 | Cornelius . |
| 2,294,266 * | 8/1942 | Barnard . |
| 2,465,283 * | 3/1949 | Schlehr . |
| 2,591,708 | 4/1952 | Lubetti . |
| 2,926,708 | 2/1960 | Edan . |
| 3,498,779 | 3/1970 | Hathaway . |
| 3,520,979 | 7/1970 | Scarfe et al. . |
| 3,568,611 | 3/1971 | Konrad . |
| 3,633,886 | 1/1972 | Froberg . |
| 3,658,505 | 4/1972 | Kunkle . |
| 3,806,621 | 4/1974 | Machlan . |
| 3,836,689 | 9/1974 | Heller et al. . |
| 3,897,234 | 7/1975 | Froberg . |
| 3,912,486 | 10/1975 | Jauch et al. . |
| 3,979,197 | 9/1976 | Froberg . |
| 3,983,309 | 9/1976 | Faulkner et al. . |
| 3,988,138 | 10/1976 | Rough . |
| 4,001,001 | 1/1977 | Knavich et al. . |
| 4,017,294 | 4/1977 | Sanford et al. . |
| 4,023,950 * | 5/1977 | Glaser . |
| 4,029,489 | 6/1977 | Froberg et al. . |
| 4,046,535 | 9/1977 | Stalego . |
| 4,142,880 | 3/1979 | Wenda et al. . |
| 4,159,392 | 6/1979 | Finer et al. . |
| 4,211,887 | 7/1980 | Williamson . |
| 4,312,657 | 1/1982 | Canfield et al. . |
| 4,312,658 | 1/1982 | Mayer . |
| 4,313,722 | 2/1982 | Yigdall . |
| 4,319,904 | 3/1982 | Gullett . |
| 4,324,942 | 4/1982 | Williamson . |
| 4,351,054 | 9/1982 | Olds . |
| 4,358,304 | 11/1982 | Froberg . |
| 4,362,541 | 12/1982 | Thompson . |
| 4,365,986 * | 12/1982 | Nayak . |
| 4,365,987 | 12/1982 | Boettner . |
| 4,380,463 | 4/1983 | Matesa . |
| 4,405,351 | 9/1983 | Sheinleop . |

(List continued on next page.)

Primary Examiner—Stanley S. Silverman
Assistant Examiner—Michael P. Colaianni
(74) Attorney, Agent, or Firm—Hall, Priddy, Myers & Vande Sande (57) ABSTRACT

An electric open-top melter for use in the manufacture of mineral fibers, such as fiberglass, is provided with a side-discharge outlet. The side-discharge outlet allows the melter, conditioner/refiner, and forehearth to all be located on substantially the same level, thereby allowing molten glass to flow from the side of the melter, through the conditioning zone, and into the forehearth from which spinners produce glass fibers or the like. Isolation members are provided in the conditioning or refining area so as to enable molten glass therein to be isolated from the melter and forehearth when the molten glass level is lowered below the tops the isolation members.

10 Claims, 7 Drawing Sheets

U.S. PATENT DOCUMENTS

| | | |
|---|---|---|
| 4,433,419 | 2/1984 | Williamson . |
| 4,435,811 | 3/1984 | Varrasso . |
| 4,478,628 | 10/1984 | Donn . |
| 4,483,008 | 11/1984 | Varrasso . |
| 4,491,951 | 1/1985 | Donn . |
| 4,528,013 | 7/1985 | Donn et al. . |
| 4,531,218 | 7/1985 | Williamson . |
| 4,536,205 | 8/1985 | Kromwiede et al. . |
| 4,544,396 | 10/1985 | Krumwiede et al. . |
| 4,559,071 | 12/1985 | Kunkle et al. . |
| 4,565,560 | 1/1986 | Krumwiede et al. . |
| 4,582,521 | 4/1986 | Froberg . |
| 4,592,770 | 6/1986 | Pearman et al. . |
| 4,615,720 | 10/1986 | Donn et al. . |
| 4,638,490 | 1/1987 | Donn et al. . |
| 4,638,491 | 1/1987 | Perkins . |
| 4,666,489 | 5/1987 | Demarest . |
| 4,671,765 | 6/1987 | Tsai . |
| 4,726,830 | 2/1988 | Hughes et al. . |
| 4,726,831 * | 2/1988 | Fogle et al. . |
| 4,737,178 | 4/1988 | Reifschneider et al. . |
| 4,738,702 | 4/1988 | Yigdall et al. . |
| 4,738,938 * | 4/1988 | Kunkle et al. . |
| 4,747,772 | 5/1988 | Tsai . |
| 4,794,625 | 12/1988 | Grondy . |
| 4,796,276 | 1/1989 | Froberg . |
| 4,812,372 | 3/1989 | Kithang . |
| 4,818,265 | 4/1989 | Krumwiede et al. . |
| 4,819,247 | 4/1989 | Seng et al. . |
| 4,862,477 | 8/1989 | Olds et al. . |
| 4,877,449 | 10/1989 | Khinkis . |
| 4,929,266 * | 5/1990 | Cozac et al. . |
| 4,969,942 | 11/1990 | Schwenninger et al. . |
| 4,994,099 | 2/1991 | Boettner . |
| 5,006,144 | 4/1991 | Kravish et al. . |
| 5,028,248 | 7/1991 | Williams et al. . |
| 5,120,342 | 6/1992 | Richards . |
| 5,194,081 | 3/1993 | Trevelyan et al. . |
| 5,273,567 | 12/1993 | Richards . |
| 5,346,524 | 9/1994 | Shamp et al. . |
| 5,352,258 | 10/1994 | DeGreve et al. . |
| 5,352,260 | 10/1994 | Carlson et al. . |
| 5,364,426 | 11/1994 | Richards . |
| 5,417,732 | 5/1995 | Shamp et al. . |
| 5,514,199 | 5/1996 | Houpt . |
| 5,529,594 | 6/1996 | Wetmore et al. . |
| 5,536,291 | 7/1996 | Serg et al. . |
| 5,548,611 | 8/1996 | Cusick et al. . |
| 5,551,867 | 9/1996 | Shamp . |
| 5,573,564 | 11/1996 | Richards . |
| 5,613,094 | 3/1997 | Muniz et al. . |
| 5,776,221 | 7/1998 | Dembicki et al. . |

* cited by examiner

SIDE-DISCHARGE MELTER FOR USE IN THE MANUFACTURE OF FIBERGLASS, AND CORRESPONDING METHOD

RELATED APPLICATION

This application is a division of application Ser. No. 08/917,207 filed on Aug. 25, 1997 and now U.S. Pat. No. 5,961,686.

This invention relates to a glass melter for use in the manufacture of fiberglass, and corresponding method. More particularly, this invention relates to an outlet structure for a side-discharge glass melter for use in the manufacture of fiberglass, and corresponding method, wherein the side-discharge outlet extends the melter's continuous operation time, thereby improving production efficiency.

BACKGROUND OF THE INVENTION

Glass melters, or furnaces, for use in the manufacture of glass fibers, are old and well-known throughout the art. For example, see U.S. Pat. Nos. 4,017,294 and 4,023,950.

The '294 patent generally describes an open-top electric melter, or furnace, having a central bottom discharge outlet. The melter includes a ceramic lining and a molybdenum outlet member located at the bottom of the melter, at the center thereof. The tapping block of the outlet is made of molybdenum, a material which is able to withstand high temperatures within the furnace and is substantially corrosion resistant. Unfortunately, glass melters which include outlets located at the bottom center of the melter, as in the '294 patent, have been found to suffer from a number of problems, some of which are discussed below.

The bottom center of an electric open-top glass melter experiences the highest temperatures in the melter (e.g. from about 3,1000–3,2000° F. in some electric melters). The rate of corrosion of outlet structures is temperature related. Accordingly, due to oxides found in the glass batch, molybdenum center outlets, such as that disclosed in the '294 patent, tend to wear out quicker than do refractory linings provided on the sidewalls and bottom of such furnaces. In such cases, because the outlet needs to be replaced prior to the refractory lining material, the furnace must be shut down for repairs more often. For example, assuming that the refractory lining in such an electric melter needs to be replaced approximately once a year, the molybdenum center outlet which wears out at a more rapid rate would have to be replaced every six months or so, thereby necessitating twice as many shutdowns of the furnace than would be needed if the refractory and outlet structure wore out, and could be replaced, at the same time. Each time a melter in a fiberglass manufacturing plant is shut down in order to replace either the outlet structure or the refractory lining, production and output suffer. This is undesirable.

U.S. Pat. No. 4,001,001 discloses a combination gas and electric furnace that is horizontal in design (i.e. the melter and refiner are at substantially the same level) and adapted for melting glass batch materials in part by the application of heat from overhead flames within the furnace. This furnace includes electric heating electrodes submerged within the batch material and gas fueled flame firing ports located in the atmosphere at an elevation above the batch. The atmosphere above the batch is heated by these flames so that the entire glass batch, including the top surface of the batch, within the melter is melted into molten form (i.e. no hardened or quasi-solid glass batch is present on the top surface of the batch as it flows into the refiner).

Unfortunately, the melter of the '001 patent suffers from a number of problems, some of which are set forth below.

The melter of the '001 patent is a combination gas-electric melter, including a closed-top (i.e. hot-top) which keeps the atmosphere within the melter, above the glass batch, at a heightened temperature in order to melt the glass on the top surface of the batch. These types of melters are often viewed as inefficient with regard to energy consumption. Furthermore, this type of melter requires that the top surface of the glass batch be in molten form prior to entry into the refiner so that the spinners do not become clogged (i.e. there is no structure to prohibit entry of quasi-hardened batch on the top surface from flowing into the refiner). The atmosphere heating requirement is undesirable, very costly, and inefficient. Still further, the furnace of the '001 patent does not typically heat the batch to the extreme temperatures of electric open-top melters, and thus does not typically need to address the same degree of erosion problems associated with high temperature electric open-top melters.

U.S. Pat. No. 4,405,351 discloses another hot-top, or closed-top, gas-fueled melter or furnace used in the manufacture of glass fibers. Unfortunately, the melter of the '351 patent suffers from at least the same problems discussed above relative to the '001 patent, in that: (i) its low operating temperatures (up to 2,600° F.) do not render it susceptible to the erosion problems associated with the much higher batch temperatures of electric open-top furnaces; (ii) the fuel-air method of heating and melting the batch in the '351 patent is often inefficient and undesirable; and (iii) the throat or side outlet through which the molten glass flows into the refiner would erode much too quickly if exposed to the higher temperatures of electric furnaces. For example, if the throat (typically made of refractory material which can withstand. the heat generated in a gas furnace) in the '351 patent was exposed to temperatures on the order of from about 2,700–3, 200° F., it would break down/erode, especially upwardly, due to "upward drilling" of the throat. However, because the temperatures maintained within the batch in the gas melter of the '351 patent are so low, this problem is not addressed therein.

In view of the above, it is readily apparent that there exists a need in the art for an electric open-top glass melter, and corresponding method, for use in the manufacture of glass fibers wherein the melter is provided with an outlet or throat structure that wears out at a slower rate than do prior art outlets which are located at the bottom center of the melter, and which prevents solid or quasi-solid glass batch and eroded refractory from flowing from the melter interior toward the forehearth. Still further, there exists a need in the art for a melter that has reduced downtime (i.e. an increase in production results).

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing an open-top electric melter system for use in the forming of glass fibers, the open-top electric melter system comprising:

a melter including a water cooled melter shell with an interior area for holding glass material therein, the shell having an open-top so that the atmosphere above the glass material is not heated other than by way of heat emitted from glass in the melter;

electrical heating means for heating the glass material in the melter so that a substantial portion of the glass material in the melter is in heated molten form and a top surface of the glass material in the melter is substantially unmelted and in quasi-solid or solid form;

a side-discharge outlet located at a side of the melter, the outlet permitting molten glass from within the melter to flow out of the melter and into a conditioning area; and wherein the side-discharge outlet includes an elongated metallic tube having a flow aperture defined therein through which the molten glass flows from the melter toward the conditioning or refining area, the flow aperture defining a top edge and a bottom edge and being located between the interior of the melter and the conditioning area.

This invention also fulfills the above-described needs in the art by providing a method of forming glass fibers by utilizing an open-top melter, conditioning structure, and forehearth, the method comprising the steps of:

providing the melter, conditioning or refining structure, and forehearth;

loading glass materials to form glass, such as $SiO_2$, CaO, and the like, into the melter;

electrically heating the glass materials in the melter so as to cause a substantial portion of the glass materials in the melter to transform into molten form, with a top surface of the glass material in the melter remaining in solid or quasi-solid unmelted form due to the ambient atmosphere above the glass material in the open-top melter;

causing the molten glass to flow out of the melter by way of a side-discharge outlet defined therein, the side-discharge outlet including a metallic tube surrounded by refractory material;

the molten glass flowing from the melter, through the discharge outlet, and into the conditioning or refining area or structure, and thereafter into the forehearth after which glass fibers are formed.

In certain preferred embodiments, the side-discharge outlet is provided with an elongated metallic (e.g. molybdenum) tube surrounded by both refractory material and a water cooling chamber.

In certain preferred embodiments, the conditioning or refining structure is provided with a pair of isolation members located at opposite ends thereof, the isolation members allowing molten glass between them to be isolated from both the melter and forehearth when the molten glass level within the system is lowered to a level below the tops of the isolation members. This allows for more efficient maintenance to be performed on the system.

This invention will now be described with reference to certain embodiments thereof and is illustrated in the following drawings.

DETAILED DESCRIPTION OF CERTAIN EMBODIMENTS OF THIS INVENTION

Referring now more particularly to the accompanying drawings in which like reference numeral indicate like parts throughout the several views.

Figure 1:
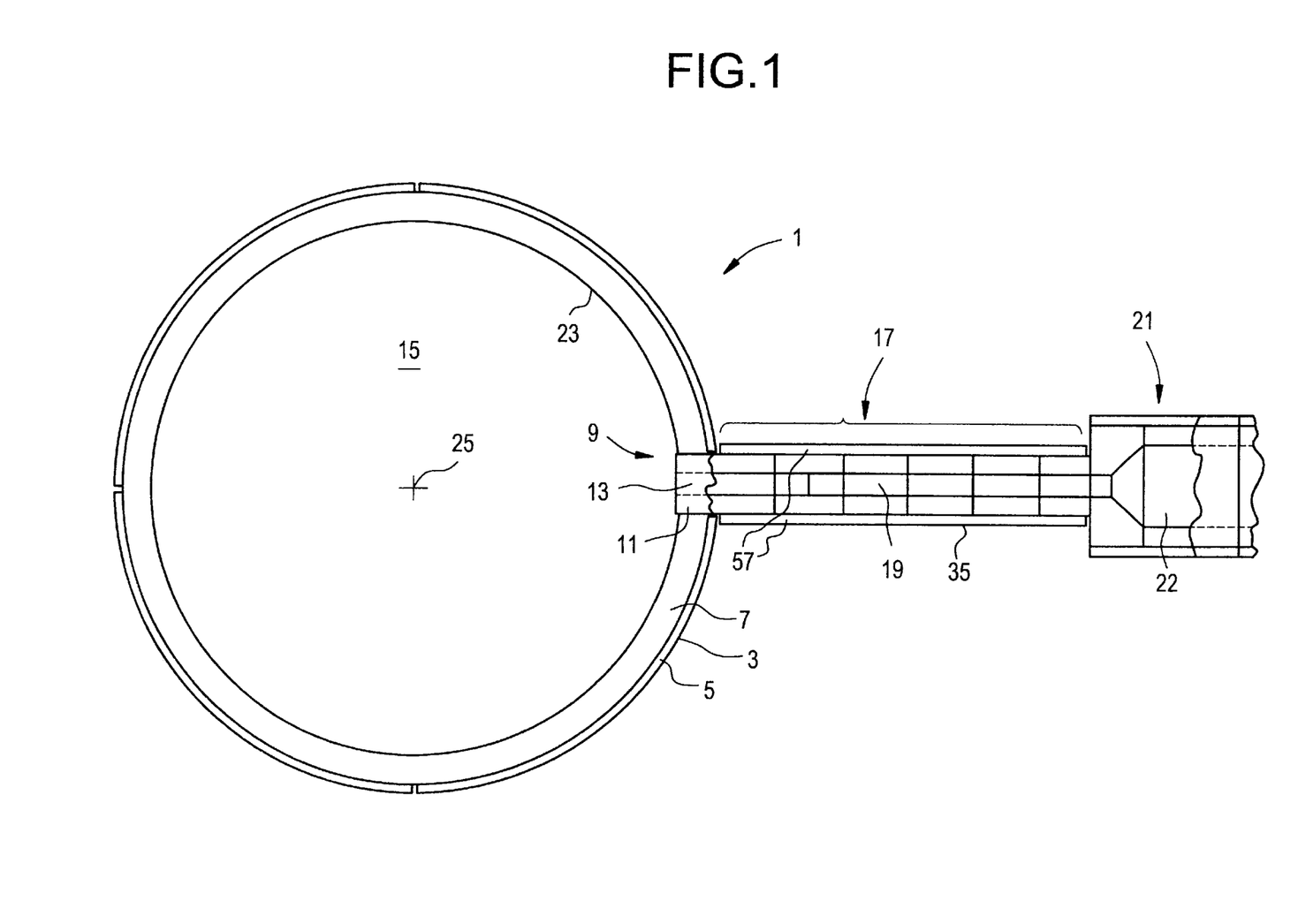
FIG. 1 is a top plan view of a side-discharge glass melter according to an embodiment of this invention.

FIG. 1 is a top plan view illustrating an electric, open-top, glass melter for use in the manufacture of glass fibers, according to an embodiment of this invention. As illustrated, melter 1 includes vessel 3 having a water-cooled metallic (e.g. steel) outer shell 5 and a refractory sidewall and bottom lining 7, the melter or furnace 1 being supported on a conventional support structure which is not illustrated, in order to receive or house molten glass batch in its interior cavity 15. The annular portion of the melter, defined within shell 3, houses the molten glass, the top surface of which is typically unmelted or hardened batch (i.e. in solid or or quasi-solid form) due to the relatively lower temperature of the ambient atmosphere located above the surface of the batch. Thus, the surface is typically unmelted batch which consists essentially of a proportion blend of the various raw materials (e.g. $SiO_2$, $B_2O_3$, $C_aO$, etc.) from which a glass is formed. The unmelted batch functions as both an insulation cover over top of the molten glass pool below, and a source of vitrifiable material in that it can be melted.

Due to the heating power directed to the glass via glass melting electrodes 8 (see FIGS. 2 and 4), the molten glass within the melter is typically maintained at a temperature of about 3,1500–3,2500° F. near the center of the melter and about 2,500°–2,7000° F. near the sidewalls. Thus, the electric melter maintains the glass batch at temperatures of from about 2,5000–3,2500° F., (preferably from about 2,800–3,2500° F.) with the open or ambient atmosphere above the batch being ambient temperature more than just a few feet away from the batch surface.

Figure 2:
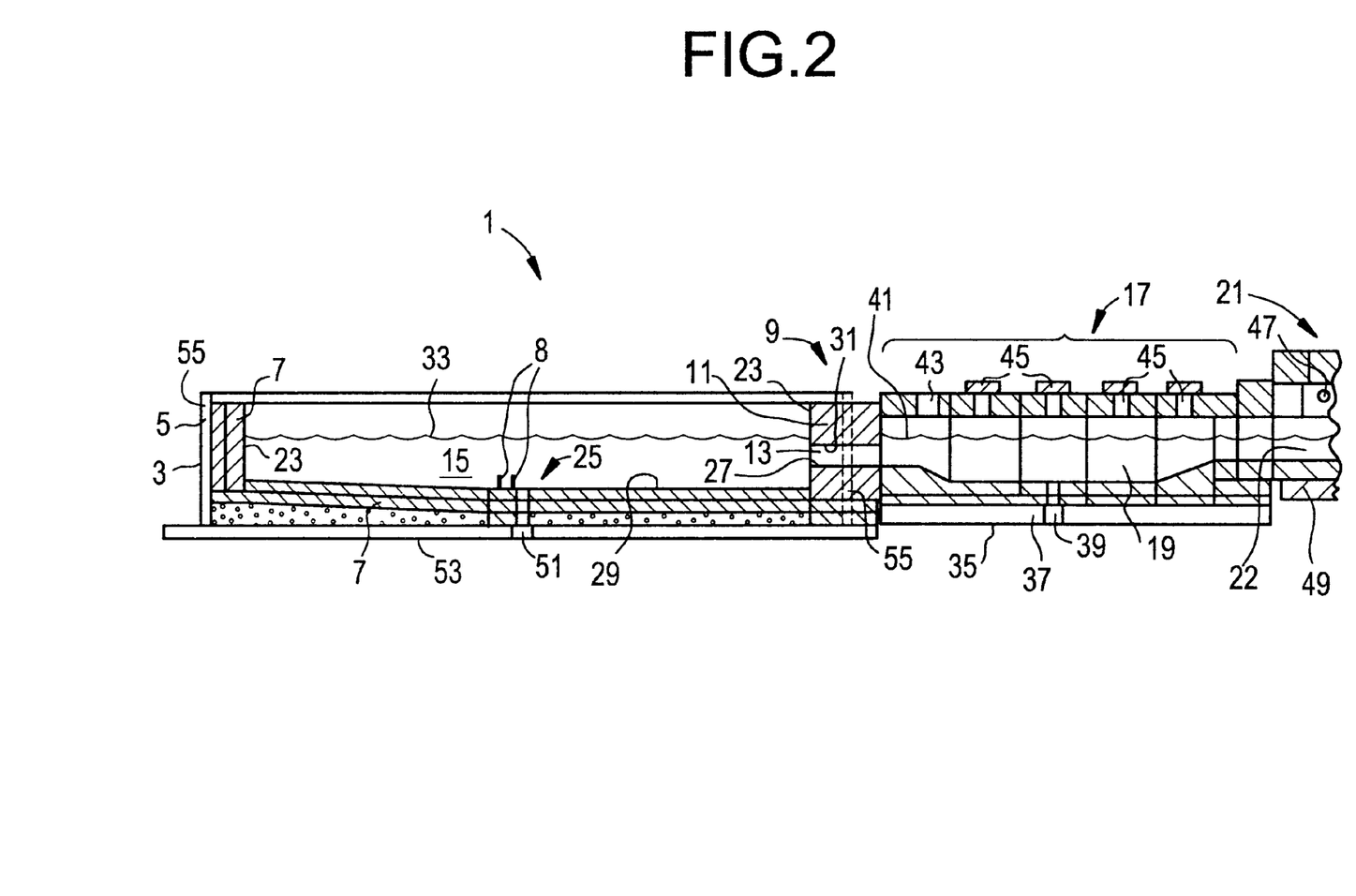
FIG. 2 is a side cross-sectional view of the melter of FIG. 1.

Referring to FIGS. 1–2, the melter includes a side-discharge outlet structure 9 located on one side or edge of the annular portion of the melter. Side-discharge outlet structure 9 includes metallic throat structure 11 having elongated orifice 13 defined therein, which allows molten glass batch to flow from the interior 15 of vessel 3 into conditioning or refining zone 17 where the glass is refined and volatiles are driven or burned off, and sometimes recycled. For example, sodium borate vapors, which are corrosive, are burned off and/or recycled to vessel 3, within conditioning zone 17.

While in conditioning zone 17, the glass batch is present within and flows through elongated chamber or channel 19. The molten glass flows from the conditioning zone 17 and channel 19 into glass delivery area, or forehearth 21. Forehearth 21 includes equipment for forming glass fibers, such as burners 47, and conventional spinners or fiberizers.

Figure 10:
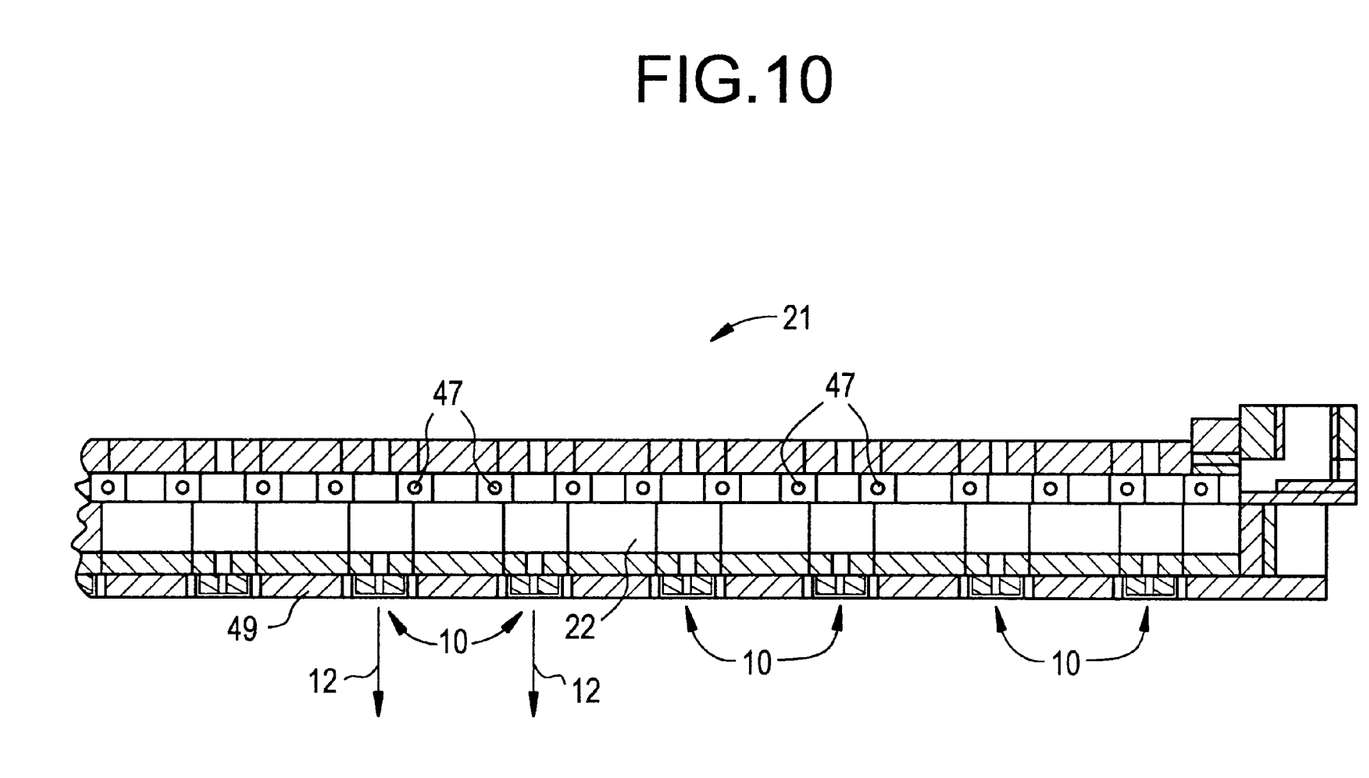
FIG. 10 is a side cross-sectional view of a forehearth used in any embodiment of this invention.

FIG. 10 is a side partial cross-sectional view of a forehearth 21 used in any embodiment of this invention, illustrating burners 47, channel 22, and bushings 10. The molten glass flows along a channel 22 defined within forehearth 21 and is withdrawn through bushings 10 thereby dropping 12 as molten glass streams into corresponding spinners. Molten glass within the spinners is forced to flow through orifices in walls of the spinners by centrifugal force thereby forming the glass fibers as known in the art. An exemplary spinner is illustrated, for example, in U.S. Pat. No. 4,737,178, the disclosure of which is incorporated herein by reference.

Because central outlets or discharges in electric melters wear out at a rather rapid rate, the side-discharge outlet structure 9, of the different embodiments of this invention, is positioned and designed so as to wear out at a slower rate such that refractory 7 along with the outlet structure 9 may be replaced or otherwise maintenanced simultaneously during the same shutdown of the melter 1. This improves productivity and efficiency.

Because the glass batch within area or cavity 15 of vessel 3 is cooler nearer sidewall 23 than it is proximate the center 25 of the melter, the outlet structure 9 as positioned is less susceptible to corrosion and breaking down, due to the fact that such corrosion is a function of temperature (i.e. the higher the temperature, the quicker the corrosion/breakdown of the outlet structure).

As can be seen in FIGS. 1–2, melter 1 including vessel 3, along with the conditioner structure of the conditioning zone 17 and forehearth 21 are all on substantially the same level (i.e. they are substantially planar relative to one another). This is an important feature of certain embodiments of this invention, as it allows the mineral fiber or glass fiber manufacturing facility to save, or delete, an entire floor. For example, in typical fiberglass manufacturing facilities, (e.g. see U.S. Pat. No. 4,023,950, the disclosure of which is incorporated herein by reference), the melter is located above, and on a different elevation or level, than the forehearth due to the bottom outlet. Often, the melter will be on one floor of a manufacturing facility, with the forehearth into which the molten glass flows being located on another floor located at an elevation beneath the floor upon which the melter is provided. The structure according to certain embodiments of this invention, wherein the melter 1, conditioning zone 17, and forehearth 21 are all located on the same level, allows all of this to be located on the same floor, thereby eliminating the need for the additional floor which is often required in the prior art. Also, the use of prior art melter needles in the center of the melter is eliminated [no center orifice or needle is needed] in this invention.

Outlet structure 9 may be varied according to different embodiments of this invention. However, referring to FIGS. 2 and 4, it is important that the bottom edge 27 of aperture 13 be located at an elevation substantially above (e.g. from about 2–6 inches above, and preferably at least about 2 inches above) the bottom wall 29 of vessel 3 proximate the outlet so that corroded refractory materials which have eroded from the bottom and sidewall areas of the melter and are located at the bottom thereof, cannot flow out of area 15 through throat orifice 13. Furthermore, it is also important that the top edge 31 of orifice 13 be located at an elevation substantially below (e.g. from about 2–6 inches below and preferably at least about 2.0 inches below) the top unmelted batch surface 33 of the glass batch within area 15. This is because, in an electric open-top melter such as those described according to the embodiments of this invention, the top surface 33 of the batch is typically hardened, or in solid or quasi-solid glass form due to the ambient atmosphere above level 33 that is at substantially at an ambient temperature. By locating the top edge 31 of throat orifice 13 at an elevation substantially below top batch surface 33, the structure 9 prevents solid unmelted glass batch materials from flowing from vessel 3 into conditioning zone 17 and forehearth 21 where it may clog or block the bushings 10 and/or spinner apertures [the spinners have apertures with diameters of from about 0.013–0.025 inches]. This is important because, due to the lower temperatures within refining zone or conditioning zone 17, and forehearth 21, if solid glass batch were to make its way thereinto, it may not melt thereby resulting in such clogging.

As illustrated in FIGS. 1–4, metallic throat member 11 is annular or cylindrical in shape, and has defined therein cylindrical elongated aperture 13 which allows area 15 within vessel 3 to communicate with passageway 19 within the conditioning zone. Throat 11 is typically made of molybdenum (Mb), which is resistant to corrosion at high temperatures. According to certain embodiments, the diameter of annular aperture 13 may be approximately two inches (or from about 1.5 to 4.0 inches) so that the molten glass throughput through throat aperture 13 from area 15 into passageway 19 is approximately 6,000 lbs. per hour (or from about 5,000–7,000 lbs./hr.), and the velocity through aperture 13 (when the inner diameter aperture of the orifice is from about 1.5–3.0 inches) would be from about 13–28 feet per minute. When orifice 13 has a diameter of about 2", the velocity may be about 28 feet/min. in certain embodiments of this invention. The outer diameter of throat 11 may be from about 4–7 inches. It is to be recognized that throat 11 need not be cylindrical or annular, and may take on various shapes (e.g. rectangular) according to alternative embodiments of this invention. In certain embodiments such as in FIGS. 3–4, throat member 11 may include a molybdenum elongated tube which defines aperture 13 therein, this tube being surrounded by refractory block thereby making up a multi-piece throat member 11. Alternatively, throat member 11 may be made of platinum (Pt), or platinum clad refractory.

Throat 11 is of Mo, or the like, so that upward drilling, or erosion, thereof is prevented, thereby keeping solid batch from making its way toward the forehearth.

Referring to FIGS. 1–2, conditioner or conditioning zone 17 of this embodiment includes an elongated passageway 19 defined within surrounding structure 35. Conditioner structure 35 includes a water cooled floor panel 37, conditioner drain 39, passageway 19 connecting orifice 13 with forehearth 21 (the level or elevation of the molten glass within the conditioner is illustrated by reference numeral 41), heating vent 43 (one provided) and finally cooling vents 45 (four provided). With regard to forehearth 21, the forehearth includes a plurality of burners 47 provided above the level 41 of the molten glass, and an encompassing forehearth structure 49 as is known in the art. Melter 1 further includes melter drain 51 that is defined within water cooled floor panel 53. Water cooled side panels 55 are also provided in order to maintain a lower refractory temperature proximate the sidewalls within area 15 and to extend the life of the refractory lining 7.

According to certain embodiments, the bottom edge 27 of throat orifice 13 is located at an elevation of about six inches above floor 29 of the melter, and top edge 31 is located at an elevation approximately six inches below the level 33 of the batch within the melter. Meanwhile, according to this embodiment, level 33 is maintained at an elevation of approximately sixteen inches above floor 29 proximate the center of the melter. Interior 15 of the melter may have a diameter of approximately 12.5 feet according to certain embodiments, while throat structure 11 may have a length, defined between the end adjacent area 15 and the end adjacent passageway 19, of approximately eighteen inches. According to certain embodiments, the structure of conditioning zone 17 further includes water cooled side panels 57, as illustrated in FIG. 1. As illustrated, the bottom or floor 29 of the melter may be sloped downward toward the center from the side opposite the outlet.

Figure 3:
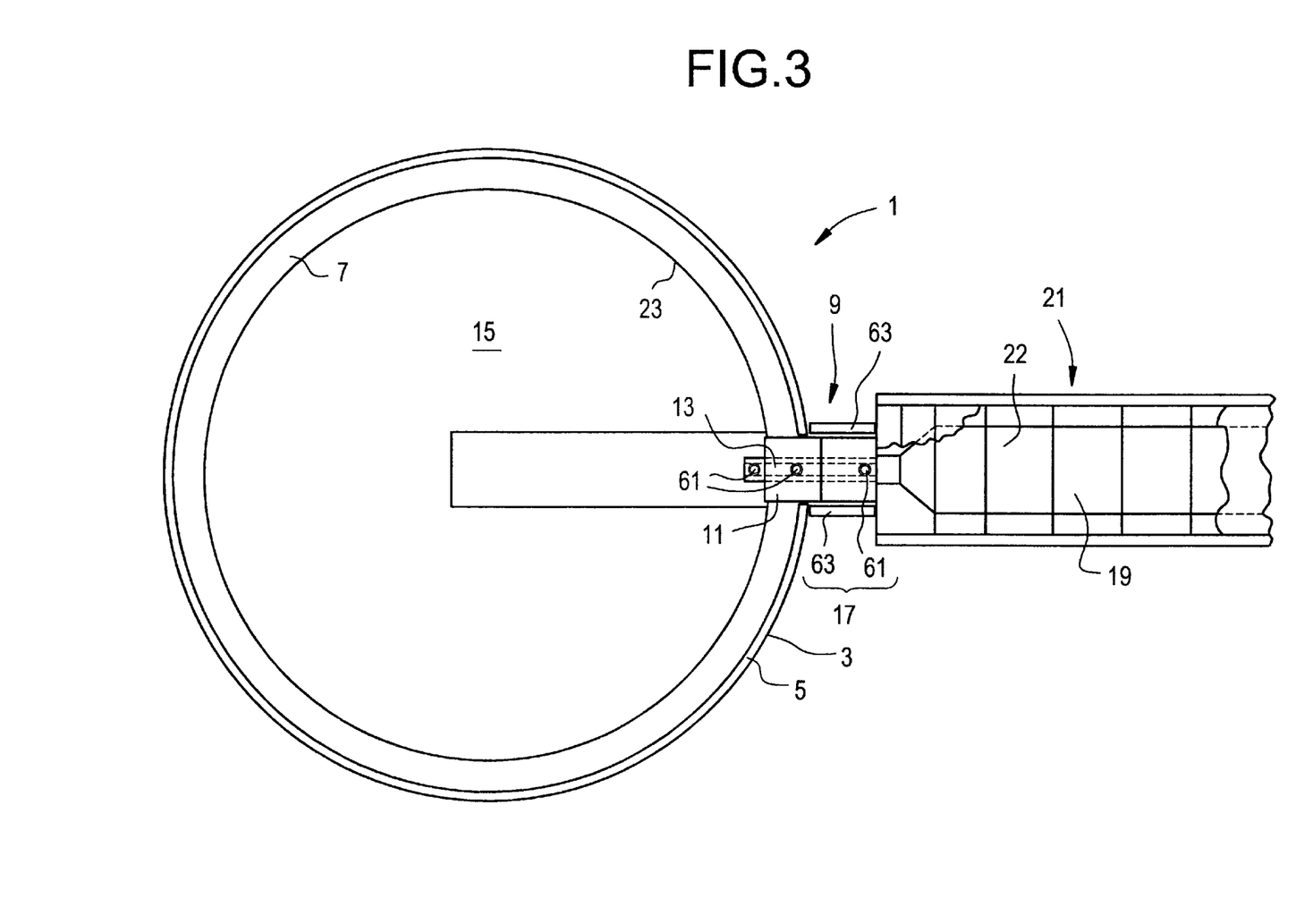
FIG. 3 is a top view of a side-discharge glass melter according to another embodiment of this invention.
Figure 4:
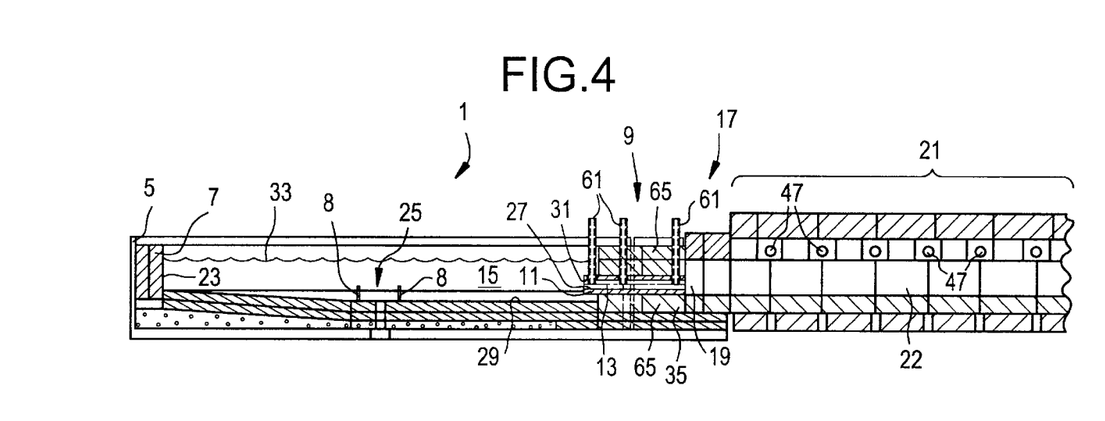
FIG. 4 is a side cross-sectional view of the FIG. 3 melter.

FIGS. 3–4 illustrate a melter 1, and corresponding side-discharge structure 9, according to another embodiment of this invention. The apparatus of FIGS. 3–4 is similar to that of FIGS. 1–2, except that a different discharge or outlet structure 9 is provided. The discharge structure 9 according to the FIG. 3–4 embodiment, includes elongated throat tube 11 (e.g. made of molybdenum) defining elongated passageway or aperture 13 therein, three separate water cooled molybdenum electrodes 61, a water cooled throat wall 63 (one such water cooled wall on each of the opposing two sides of the throat), and refractory material 65 supporting and enveloping the molybdenum throat tube 11. As illustrated, the refining zone 17 in this embodiment is shorter in length than the zone 17 in the FIG. 1–2 embodiment.

Figure 5:
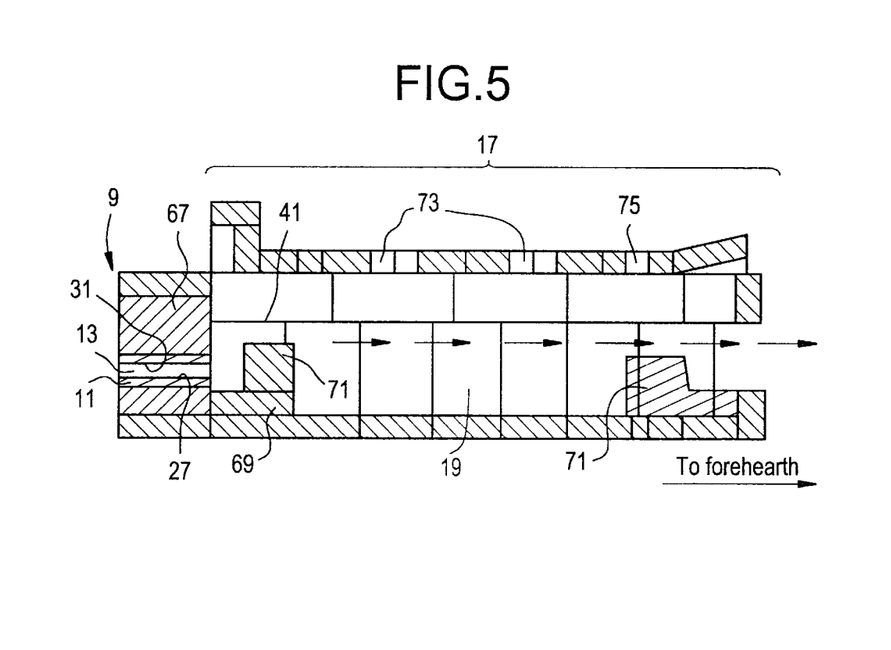
FIG. 5 is a side cross-sectional view of a side-discharge throat structure which may be used in any of the above-described embodiments.

FIG. 5 is a side cross-sectional view of a throat structure 9 and conditioning zone 17 according to another embodiment of this invention. An upwardly extending projection or step member 71 is provided proximate each of the two opposing ends of the conditioning zone 17 in channel 19, in order to enable the molten glass level 41 to be lowered (e.g. during maintenance procedures), such lowering resulting in a level 41 below the tops of members 71 so as to isolate the molten glass in zone 17 from both the forehearth and the melter (e.g. molten glass cannot flow therebetween because it is trapped between the two members 71).

In this embodiment shown in FIG. 5, elongated cylindrical molybdenum tube 11, defining aperture 13 therein, is provided so as to be in communication with passageway 19 and the interior 15 of vessel 3. The remainder of the throat structure includes multiple pieces of refractory material 67 which encompass and surround tube 11, as well as support member 69 and projections 71 that are provided proximate the outlet side of tube 11 and proximate the other end of channel 19. Projections 71, due to their locations help isolate the forehearth and melter from the conditioning structure and zone 17. Thus, one can isolate the molten glass in the conditioner from the melter and forehearth (e.g. when one has to shut down the system and perform maintenance) by simply lowering the glass level (from its illustrated position used during normal fiber forming operations) a few inches to a level below the tops of projections 71 (e.g. isolate during draining). The top of each projection 71 is typically located about 2–3 inches below the normal molten glass level. It is noted that there is no supplemental heating energy provided on or in the conditioner, in certain embodiments.

Figure 6:
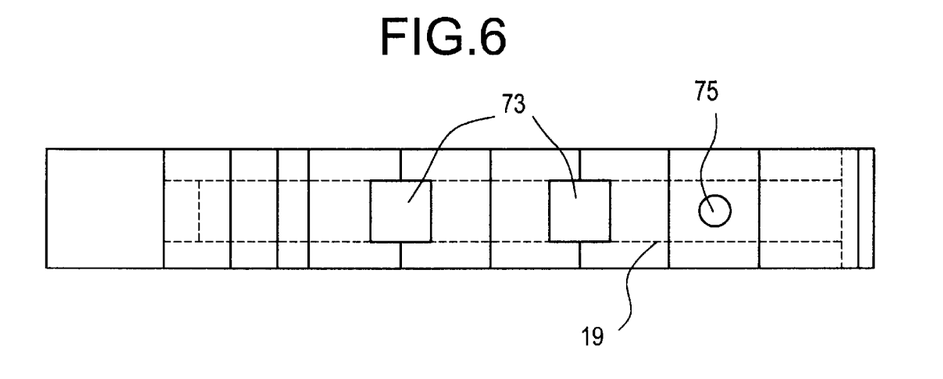
FIG. 6 is a top plan view of the FIG. 5 throat structure.
Figure 7:
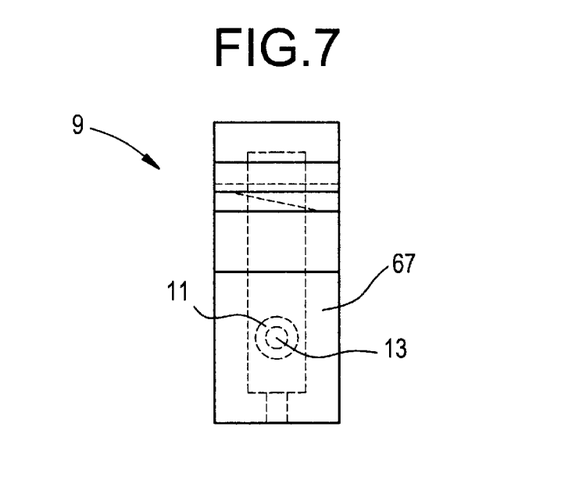
FIG. 7 is an end view of the throat structure of FIGS. 5–6.

The conditioning structure 17 further includes a pair of optional burner openings 73 and an optional needle opening 75 in a top wall thereof (and corresponding opening in the bottom wall that is not shown). From the illustrated conditioner in FIG. 5, the molten glass batch flows into the forehearth 21, described above. FIG. 6 is a top plan view of the throat and conditioner structure of FIG. 5, illustrating elongated passageway 19, optional burner openings 73 which enable the temperature within the conditioner to be maintained at a heightened level so as to keep the glass batch in molten form, optional needle opening 75, and the surrounding conditioner structure. FIG. 7 is an end view of the FIG. 5–6 throat structure, illustrating tube 11 within the surrounding refractory 67.

Figure 8:
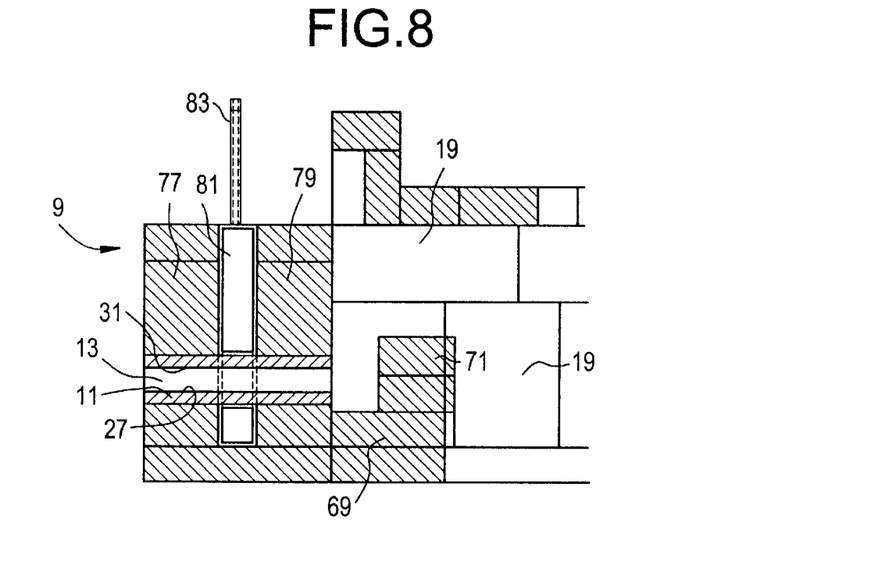
FIG. 8 is a side cross-sectional view of a throat structure which may be used in any of the above-described embodiments, according to another embodiment of this invention.
Figure 9:
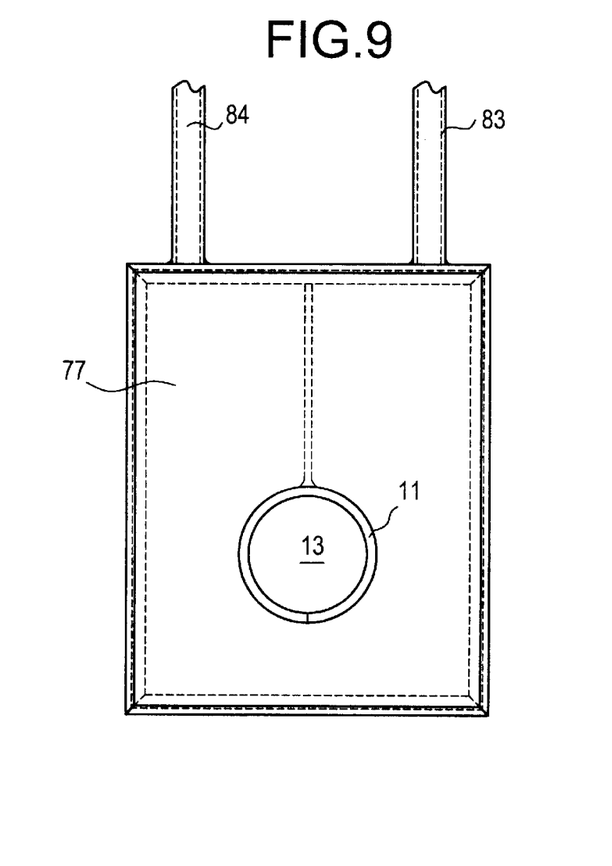
FIG. 9 is an end view of the FIG. 8 throat.

FIG. 8 is a side cross-sectional view of a throat or discharge structure 9 according to yet another embodiment of this invention. As illustrated in FIGS. 8–9, this discharge structure 9 includes elongated molybdenum tube 11 defining passageway 13 therein, first refractory member 77 and second member refractory 79 surrounding and supporting tube 11, and water cooling chamber 81 having a water inlet 83 and a similar water outlet 84 spaced radially from the inlet. Water is injected through inlet 83 into annular water cooling cavity 81 in a pressurized manner so that the water then exits the outlet 84 thereby cooling refractory members 77 and 79, as well as tube 11, so as to help elongate their life spans and prevent corrosion.

Once given the above disclosure, many other features, modifications, and improvements will become apparent to the skilled artisan. Such other features, modifications, and improvements are therefore considered to be a part of this invention, the scope of which is to be determined by the following claims.

I claim:

1. A method of melting glass in an open top melter system, the steps comprising:
    a) providing a melter for holding and melting glass material therein including a water cooled shell and a walled structure having a sidewall joined at its base to a substantially circular bottom wall thereby to define a substantially cylindrical electric melter and further including in a said sidewall, a side discharge outlet for discharging molten glass from said melter and formed of a substantially corrosion resistant metal having a rate of corrosion which increases with temperature;
        said side discharge outlet having an entrance end and an exit end thereby to define a molten glass flow communication path between an interior of the melter and the exterior thereof for discharging said molten glass from said melter;
    b) providing glass material in said melter to be melted to form said molten glass;
    c) heating and melting said glass material in said melter in such a manner that a substantial portion of the glass material in the melter is in molten form and a top surface of the glass material in the melter is substantially unmelted and is in quasi-solid or solid form and wherein the highest temperature in said molten glass is created in a selected location within said melter above and proximal the center of said substantially circular bottom wall and the lower temperature of said molten glass is located near said sidewall;
    d) discharging molten glass from said melter through said side discharge outlet,
    e) locating said discharge outlet within said sidewall such that said entrance end of said outlet is spaced from said selected location of highest temperature and proximal the said lower temperature near the sidewall such that said discharge outlet corrodes at substantially the same rate as said sidewall.

2. The method of claim 1 wherein said side discharge outlet includes an elongated tube comprised of said substantially corrosion resistant metal.

3. The method of claim 1 which further includes the steps of:
    providing a forehearth;
    providing a conditioning area between said melter and said forehearth so as to be in flow communication with the exit end of said discharge outlet and said forehearth;
    discharging said molten glass from said melter into said conditioning area,
    conditioning said molten glass in said conditioning area; and
    discharging said molten glass from said conditioning area into said forehearth.

4. The method of claim 3 wherein said heating and melting step includes heating the glass material in said selected location of the highest temperature to about 3,150°–3,250° F. and heating the molten material near said sidewall to about 2,500°–2,700° F.

5. The method of claim 3 which includes the further step of providing said melter, conditioning area and said forehearth all on substantially the same level.

6. The method of claim 3 which further includes the further steps of:

provﾠiding said conditioning area with first and second isolating members, each of said first and second isolating members having a top surface;

providing the molten glass within said conditioning area at a level above the tops of said isolating members; and allowing molten glass to flow through the conditioning area over the top of the isolating members and into the forehearth.

7. The method of claim 6 wherein said method includes conditioning said molten glass in said conditioning area, said conditioning step including lowering the glass level below the top of the isolating members for a sufficient time to isolate and condition the molten glass in the conditioning area.

8. The method according to claim 1 wherein said discharge of molten glass from said discharge outlet is at a rate of about 13–28 feet per minute.

9. The method according to claim 1 wherein said discharge outlet is comprised of an elongated tube which includes molybdenum.

10. The method according to claim 1 wherein said discharge outlet includes means for cooling said outlet and said method further includes the step of cooling said outlet.

* * * * *

UNITED STATES PATENT AND TRADEMARK OFFICE
CERTIFICATE OF CORRECTION

PATENT NO. : 6,178,777 B1  
DATED : January 30, 2001  
INVENTOR(S) : Vaughn Charles Chenoweth Page 1 of 1

It is certified that error appears in the above-identified patent and that said Letters Patent is hereby corrected as shown below:

Column 1,  
Line 34, delete "3,1000-3,2000", and insert -- 3,100-3,200 --.

Column 2,  
Line 31, after "withstand", delete ".".

Column 4,  
Line 36, delete "3,1500-3,2500", and insert -- 3,150-3,250 --.  
Line 37, delete "2,7000", and insert "2,700".  
Line 39, delete "2,5000-3,2500", and insert -- 2,500-3,250 --.  
Lines 39-40, after "2,800-", delete "3,2500", and insert -- 3,250 --.

Signed and Sealed this

Twenty-sixth Day of February, 2002

Attest:

Attesting Officer

JAMES E. ROGAN  
Director of the United States Patent and Trademark Office